United States Patent [19]

Thorner et al.

[11] Patent Number: 5,669,818
[45] Date of Patent: Sep. 23, 1997

[54] SEAT-BASED TACTILE SENSATION GENERATOR

[76] Inventors: Craig Thorner, 16 Nantucket Ct., Howell, N.J. 07731; Thomas K. Glass, 277 Frank Applegate Rd., Jackson, N.J. 08527

[21] Appl. No.: 409,327

[22] Filed: Mar. 23, 1995

[51] Int. Cl.⁶ ................................................. A63F 9/22
[52] U.S. Cl. .......................................... 463/30; 463/47
[58] Field of Search .......................... 273/434, 460, 273/198 B; 434/114; 340/407.1; 463/30, 47

[56] References Cited

U.S. PATENT DOCUMENTS

| | | | |
|---|---|---|---|
| 3,902,687 | 9/1975 | Hightower | 340/407.1 |
| 4,484,191 | 11/1984 | Vavra | 340/407.1 |
| 4,574,391 | 3/1986 | Morishima | 381/18 |
| 4,771,344 | 9/1988 | Fallacaro et al. | 273/460 |
| 5,203,563 | 4/1993 | Loper, III | 273/148 B |
| 5,299,810 | 4/1994 | Pierce et al. | 273/434 |
| 5,368,484 | 11/1994 | Copperman et al. | 343/69 |
| 5,513,129 | 4/1996 | Bolas et al. | 364/578 |
| 5,553,148 | 9/1996 | Werle | 381/151 |

*Primary Examiner*—Jessica Harrison
*Assistant Examiner*—James Schaaf
*Attorney, Agent, or Firm*—Thomason & Moser

[57] ABSTRACT

A seat-based tactile sensation generator capable of producing tactile sensation to a video game player corresponding to activity portrayed in a video game. Specifically, in response to signals produced by the video game, a control circuit generator produces control signals for the seat-based tactile sensation generator. The tactile sensation generator contains an array of actuators embedded within a foam seating pad. A specific arrangement of actuators positions the actuators proximate particular portions of a game player's body. Each actuator or group of actuators interacts with the player and is individually activated to produce a localized tactile sensation, e.g., an impact or vibration, corresponding to the action portrayed by the video game as it occurs.

35 Claims, 8 Drawing Sheets

SEAT-BASED TACTILE SENSATION GENERATOR

BACKGROUND OF THE DISCLOSURE

1. Field of the Invention

The invention relates to virtual reality computer systems and, more particularly, to a tactile sensation generator within a virtual reality computer system or virtual reality computer game.

2. Description of the Background Art

Video games are typically executed by microprocessors within dedicated game consoles or computers such that a player interactively manipulates a video game scene as displayed on a video monitor or television using a keyboard, mouse, joystick, or some other command input device. In addition to the video output, most game apparatus also produces an audio output that corresponds to the scene presently displayed on the monitor. In this manner, a player is exposed to both auditory and visual sensation from the game apparatus.

Although today's audio-visual game experience is exciting, the excitement is limited by the game's inability to produce any form of tactile sensation corresponding to the scene being displayed. Generally, tactile sensation, such as vibration, vehicle acceleration, crashes, and the like, have not been simulated with any great success. In one available tactile sensation generator, a modified audio speaker is positioned below a player's seat such that low frequencies in an audio signal applied to the modified speaker vibrate the seat. In such a system, the sound volume of the game must be very loud to achieve a significant sensation of vibration, and the tactile sensation only corresponds to the audio signal.

Alternatively, tactile sensation has been provided by hydraulic and pneumatic systems. However, full motion hydraulic and pneumatic systems are very expensive and bulky, requiring extensive maintenance and a significant amount of floor space. These systems are far too complex and impractical for widespread use.

Therefore, a need exists in the art for a seat-based tactile sensation generator capable of implementing control signals supplied by a video game such that the tactile sensation generator produces tactile sensation corresponding to the activity portrayed on a computer monitor by the game apparatus.

SUMMARY OF THE INVENTION

The present invention overcomes the disadvantages of the prior art by providing a seat-based tactile sensation generator capable of producing tactile sensations for a video game player corresponding to an activity portrayed by game apparatus. Specifically, the inventive generator operates in response to control signals generated by a control circuit. The control circuit is either responsive to control commands generated by a computer or video game console executing the video game program, or by a computer or game system operating in combination with an AudioSense™ control signal generator. AudioSense is a trademark of Virtual Reality Feedback Corporation. The AudioSense control signal generator is the subject of U.S. patent application Ser. No. 08/309,763, filed Sep. 21, 1994. The control circuit interprets the control commands (or audio signals) and activates the seat-based tactile sensation generator in the appropriate fashion to simulate the action occurring on the monitor.

The seat-based tactile sensation generator is composed of an array of actuators arranged within a foam seat cushion. More specifically, the actuators are motors with offset weights that vibrate a player's body in a specified pattern and intensity, or solenoids that provide jolting effects. The actuators are individually imbedded (or attached) to a foam pad fabricated to conform to a chair or seat. In this manner, the actuators can be arranged within the pad to contact specific portions of a player's body. Illustratively, a back portion of the seat-shaped foam pad contains two actuators, and a bottom portion of the pad contains four actuators arranged to contact the buttocks and each leg of a user. Each actuator is independently actuated by the control circuit to provide a localized tactile sensation.

In an alternative embodiment of the invention, the actuators may be integrated permanently into a given seating system. Such an embodiment finds use as a seat for an arcade-type video game. Furthermore, a chest pad can be added to further provide tactile sensation to the chest of a user. The chest pad is a foam pad containing one or more actuators. The chest pad is either held to the chest by a harness or by an overhead mechanism that pivots to position the chest pad into place.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
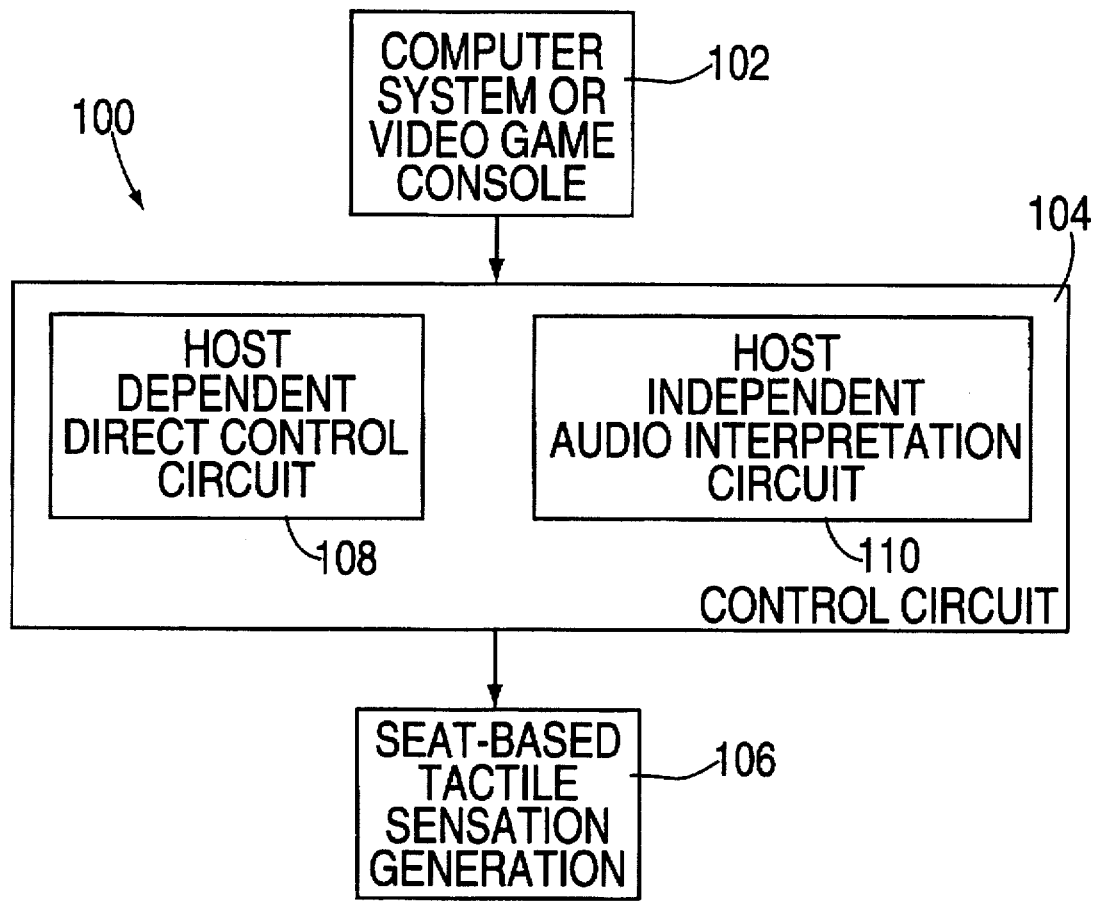
FIG. 1 depicts a high level block diagram of a virtual reality computer system connected to a seat-based tactile sensation generator.

FIG. 1 depicts a high level block diagram of a virtual reality computer system 100 containing a computer system 102, a control circuit 104, and a seat-based tactile sensation generator array 106. The computer system 102 is a conventional home computer capable of executing various computer game programs. Alternatively, a dedicated video game console or an arcade-type video game system can be substituted for the computer system. Hereinafter, the game console or computer system 102 is generally referred to as host system or merely as a host. As the host executes the game programs, the programs generate signals that are used by the control circuit to control the tactile sensation generator 106.

The control circuit 104 is either a host dependent direct control interface circuit 108 or a host independent audio-interpretation circuit 110. The host dependent direct control interface circuit 108 implements specific control commands generated by the executing program and made available to the control circuit via the parallel or serial part of the host. These commands are designed specifically to produce certain tactile sensation at particular points during the program's execution. On the other hand, the host independent audio interpretation circuit 110 analyzes an audio signal generated by the host and generates tactile sensation control signals in response to the audio signal. Such an audio interpretation circuit is disclosed in U.S. patent application Ser. No. 08/309,763, filed Sep. 21, 1994 and herein described below. Circuits 108 and 110 can be alternatively used or used in combination.

The seat-based tactile sensation generator 106 converts these control signals into tactile sensations corresponding to a present game scene portrayed on some visual system, e.g., a conventional computer monitor or television, or a stereoscopic tracking headset. These control signals activate one or more actuators in an actuator array within the tactile sensation generator to simulate any type of stimulus imposed upon a specific character or vehicle within the game scene. In a seat-based tactile sensation generator, the tactile stimulus simulates vehicle acceleration, deceleration, vibration, shaking, crashes, collisions, and the like.

Figure 2:
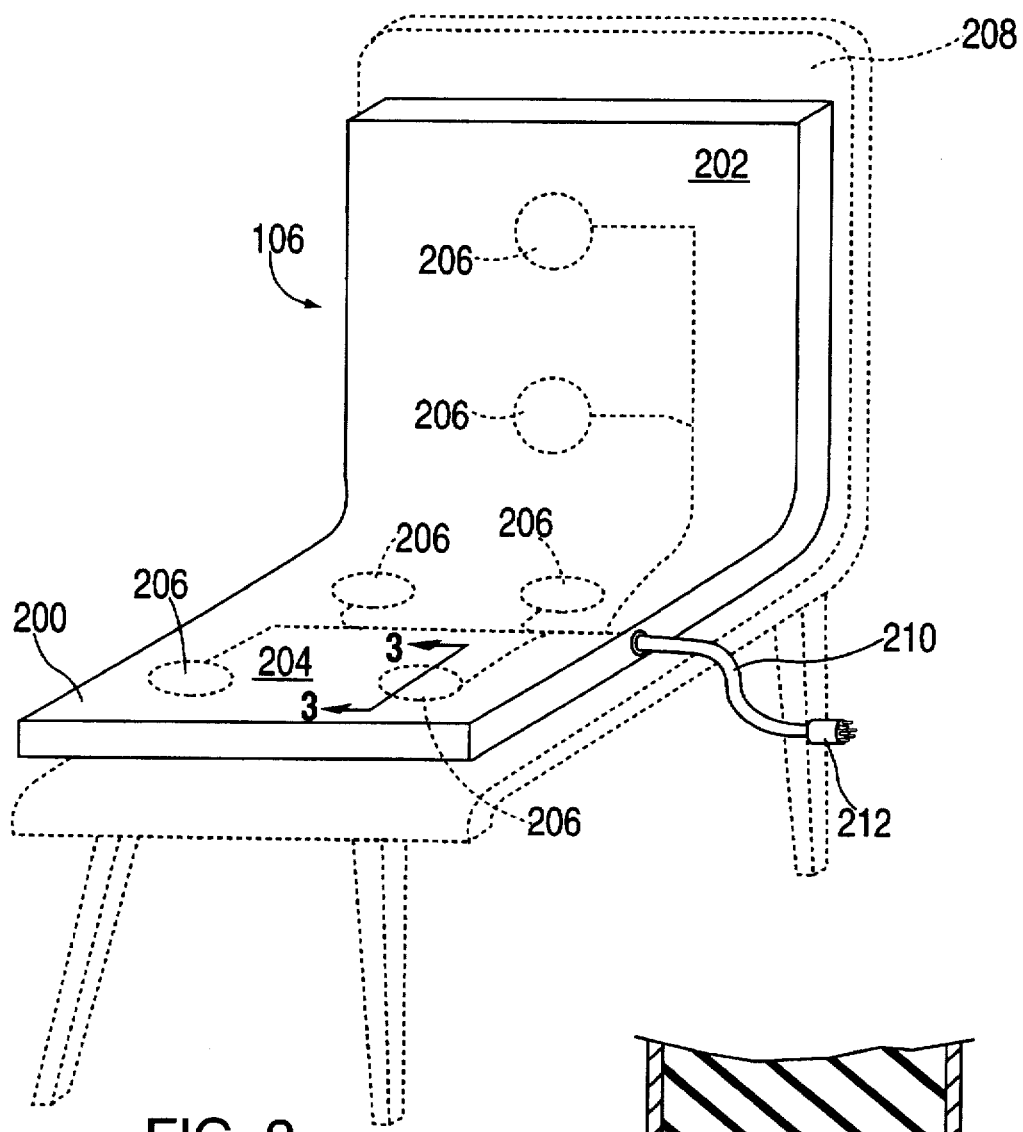
FIG. 2 depicts a perspective view of the seat-based tactile sensation generator.

FIG. 2 depicts a three-quarter perspective view of a seat-based tactile sensation generator 106 positioned upon a conventional chair 208 (shown in phantom). Although the seat-based tactile sensation generator is illustratively depicted as interfitting a conventional chair, the generator may alternatively be formed in the shape of a motorcycle seat, aircraft cockpit and the like. In whatever physical shape, in response to control signals from the control circuit, the tactile sensation generator induces tactile sensation into a person in contact with the actuator array within the generator.

Specifically, the illustrative generator 106 contains a substantially unitary flexible pad 200 having an upper portion 202 and a lower portion 204 that respectively contact the back and legs of a person seated upon the generator. The flexible pad is typically fabricated from a foam sheet such as neoprene. The pad conforms to the body of a user and to a chair upon which it is placed. The flexible pad 200 has a plurality of actuators 206 imbedded or attached thereto. In the seat based actuator array, gravity insures that the sensation generated by any given actuator 206 contacts a part of a player's body. As such, the sensation is transmitted to a player's body.

The actuators 206 are attached to or embedded within the surface of the pad. These actuators can be solenoids, piezoelectric actuators, electro-mechanical buzzers, vibrating motors, and the like, of any combination thereof. When using solenoids, an aperture is provided through the pad such that the moveable portion of the solenoid can impact the player. For illustrative purposes, the remainder of this disclosure describes the use of electric motors as actuators. Those skilled in the art will realize from this disclosure that any other form of actuator is contemplated for use as a component of this seat-based tactile sensation generator. The actuator control signals from the control circuit are connected to the generator 106 via cable and/or wiring harness 210. To ensure portability of the seat-based generator, the harness 210 is connected to the control circuit via a detachable plug 212.

Although any number of actuators in any arrangement is within the scope of this invention, the illustration shows six actuators 206 arranged such that two actuators are located in upper portion 202 and four actuators are located in lower portion 204. The four lower actuators are further arranged such that two actuators contact a user's buttocks, one actuator contacts a user's right leg and one actuator contacts a user's left leg. Furthermore, the tactile sensation generator 106 is divided into three zones. Specifically, the zones (defined while facing the seat-based tactile sensation generator) include left lower portion (right buttock and right leg actuators), a right lower portion (left buttock and left leg actuators), and an upper portion (back actuators). Each zone can be controlled as well as each individual actuator. Additionally, an external fourth zone (a chest portion) is optionally available as described in detail below with respect to FIGS. 4, 5, and 6.

The various commands from the host specify which of the actuators (or groups of actuators) shall be independently energized to simulate the game activity portrayed upon the computer monitor. As such, the game player experiences tactile sensations that simulate the various physical elements that are portrayed in the video game.

Figure 3:
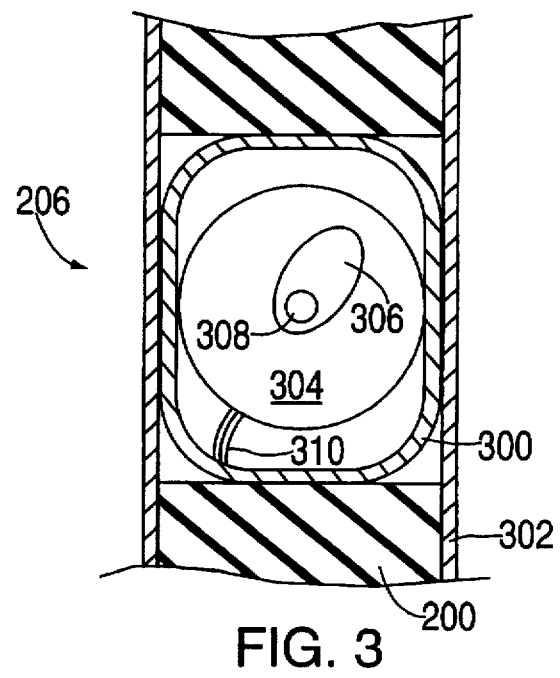
FIG. 3 is a cross-sectional view of an actuator within the seat-based tactile sensation generator of FIG. 2.

FIG. 3 depicts a cross-sectional view of an actuator 206 taken along line 3—3 in FIG. 2. The actuator is encased in a housing 300, typically fabricated of aluminum or hard plastic. A cloth, vinyl, or other covering material 302 is attached, by an adhesive or by sewing, to the surface of the pad 200. The illustrative actuator that is depicted is an electric motor 304 having an offset weight 306 attached to its shaft 308. When energized, the electric motor 304 with an offset shaft weight vibrates, thus, providing a tactile sensation to a person that is in contact with the motor or its housing. Wires 310 provide control signals and power to the motor.

In operation, the control circuit selects one or more actuators and applies an electric current to the selected actuator(s). In one illustrative implementation of a command structure, the parallel port of the host is used as the source of commands. Alternatively, a serial port could be used or the control circuit could be implemented on a circuit card for connection to a parallel bus within the host. The game program, as it executes on the host, is assumed to generate the appropriate command for the tactile sensation generator at the appropriate time.

Figure 4:
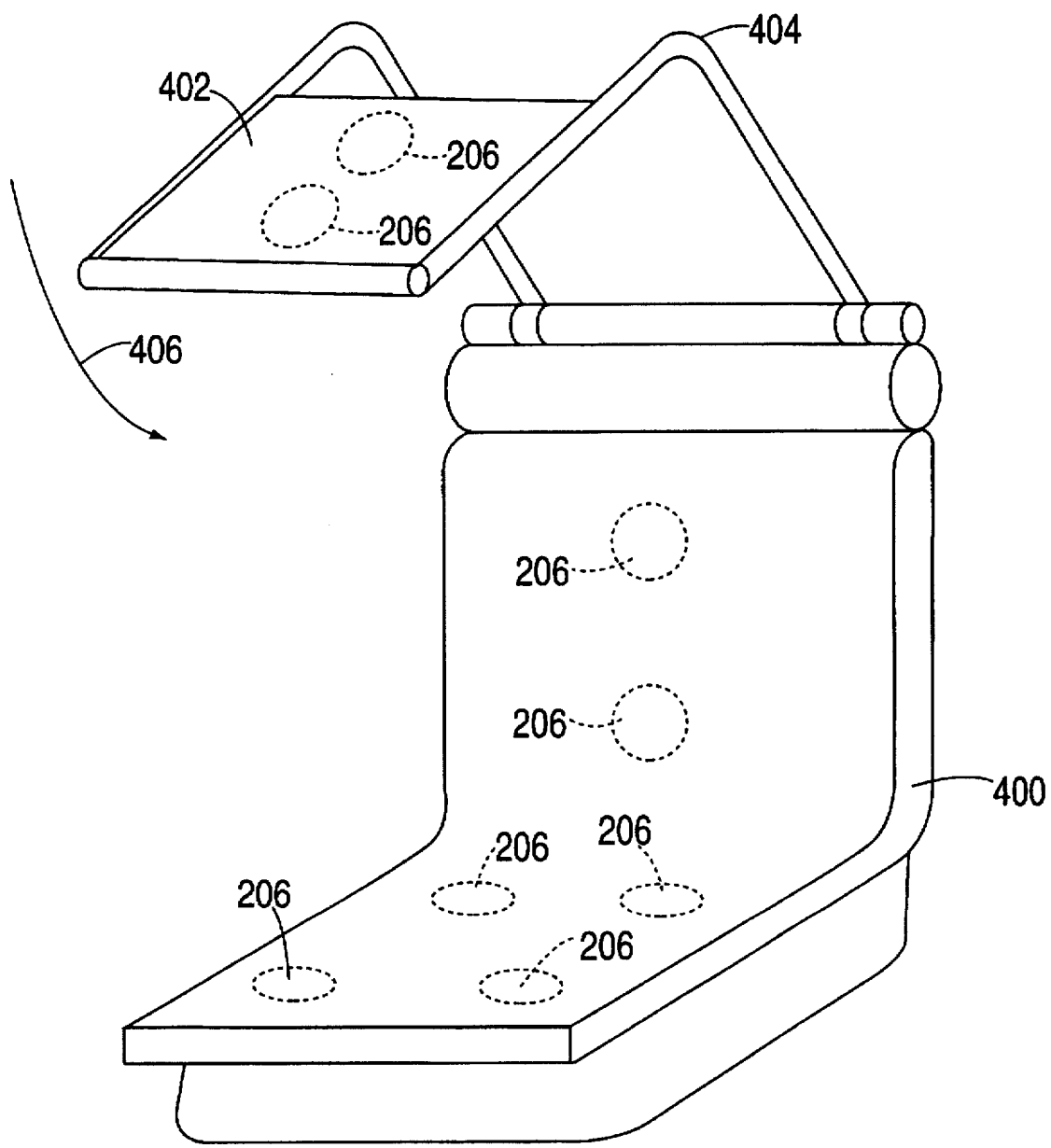
FIG. 4 is a perspective view of an alternative embodiment of the seat-based tactile sensation generator.

FIG. 4 depicts a perspective view of an alternative embodiment of the invention where the seat-based tactile sensation generator is an integral portion of a seating system 400. Such a seating system has an illustrative use within an arcade-type video game, a movie theater seat, and the like. This stationary system functions identical to the portable system discussed above.

A further alternative to either system is a chest portion. The chest portion 402 contains one or more actuators 206 that, when activated, produce a tactile sensation on the chest of a user. The actuators are generally incorporated into the chest portion in the same manner as described above for incorporating actuators into the seating system. In the stationary seating system of FIG. 4, the chest portion 402 is attached to a harness 404 that is much like an overhead harness for a roller coaster. In use, the player pulls down the harness (along arrow 406) into a position that places the actuator(s) in the chest portion in contact with his or her chest.

Figure 5:
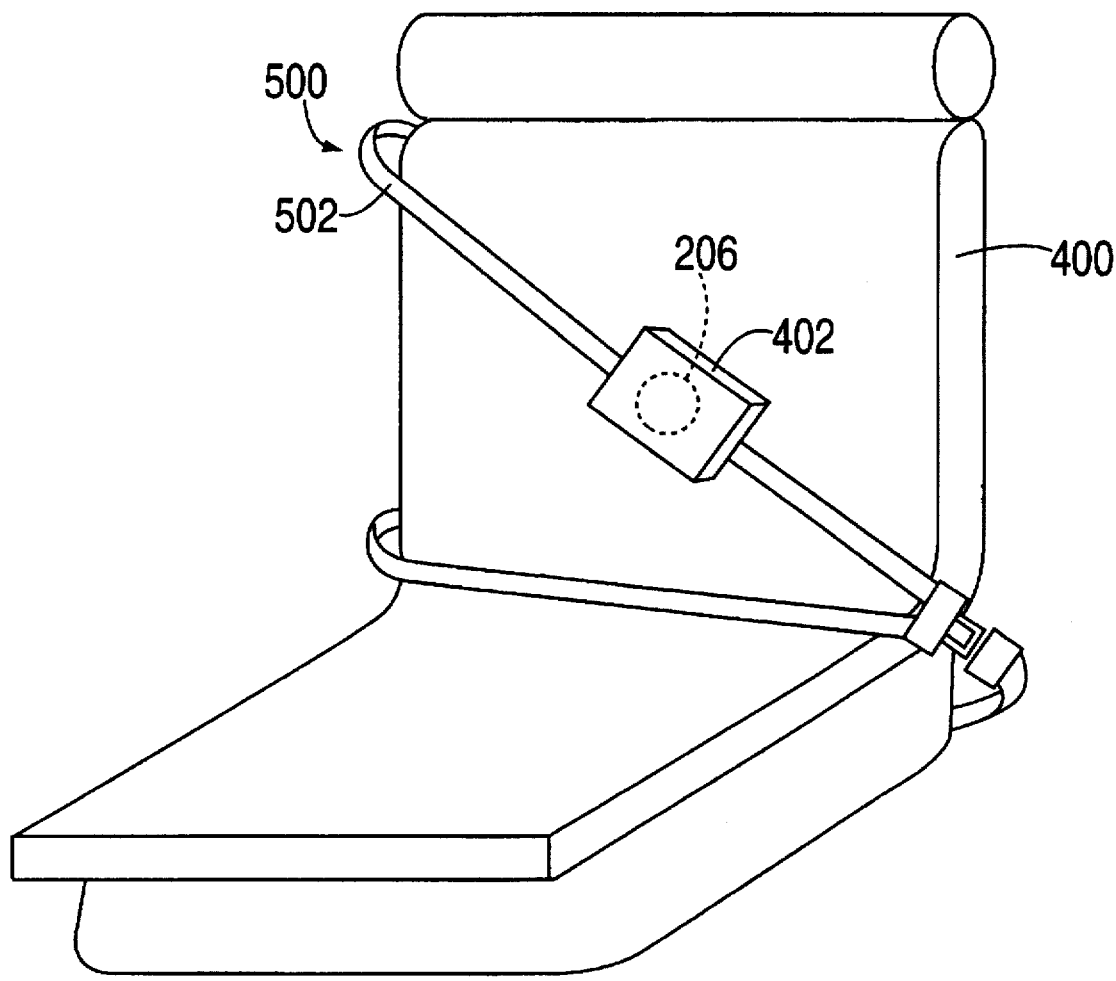
FIG. 5 is a perspective view of a seat-based tactile sensation generator having a three-point seat belt system.

FIG. 5 depicts a perspective view of an alternative attachment for the chest portion 402. In this alternative embodiment, the chest portion 402 is centrally attached to a three-point seat belt system 500. The seat belt system is, in turn, attached to the stationery seating system 400. Specifically, the chest portion 402 attaches to a shoulder strap 502 of the seat belt system 500 such that portion 402 is maintained against the user's chest.

Figure 6:
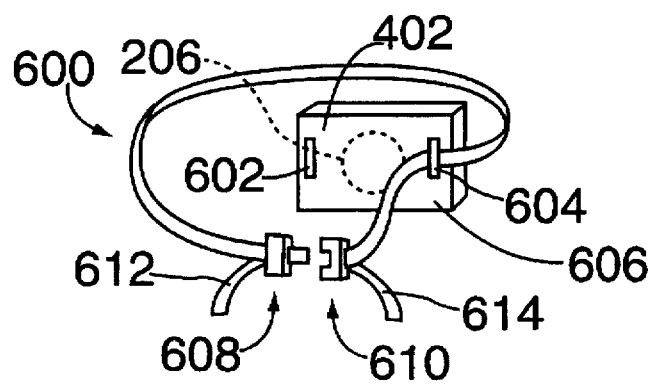
FIG. 6 is a perspective view of a harness for maintaining an actuator chest portion in contact with a user's chest.

FIG. 6 depicts a further alternative attachment of the chest portion 402. In this embodiment, the chest portion 402 is attached by a belt harness 600. The harness has a single belt which circumscribes a user's chest and maintains the chest portion of the tactile sensation generator against the user's chest.

The illustrative belt harness depicted in FIG. 6 has two fabric loops 602 and 604 affixed, by stitching or glue, to an outer surface 606 of chest potion 402. A flexible, typically fabric, belt is threaded through loop 604. Buckles (male 608 and female 610) are respectively attached to belt ends 612 and 614. During use buckle 608 and end 612 are threaded through loop 602. The buckles are moveable with respect to the belt such that, once buckled, a user can pull outwardly on belt ends 612 and 614 to tighten the chest portion 402 against their chest. Friction of the belt passing through the buckles maintains the belt in a tightened position such that the chest portion remains in contact with the user's chest. A chest portion that is strapped to a user via a multiple-belt shoulder harness is described in U.S. patent application 08/309,764, filed Sep. 21, 1994 and herein incorporated by reference.

Although various embodiments which incorporate the teachings of the present invention have been shown and described in detail herein, those skilled in the art can readily devise many other varied embodiments that still incorporate these teachings.

Figure 7:
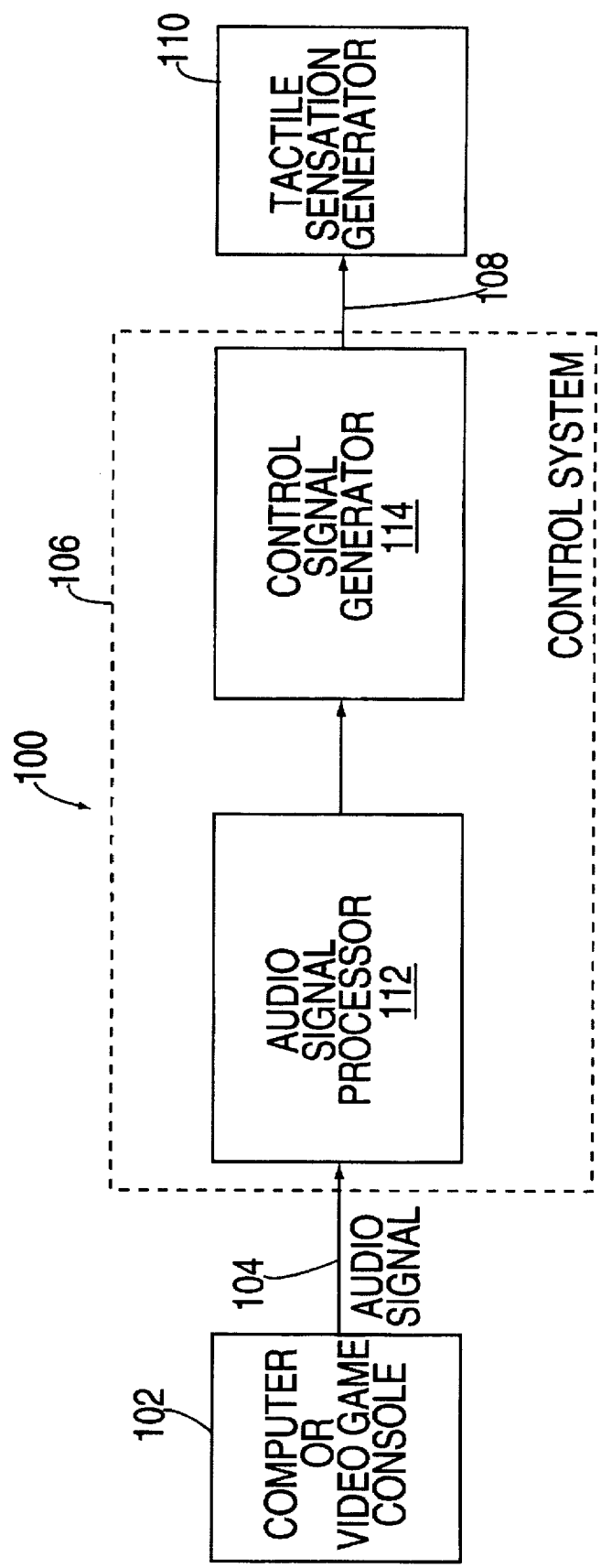
FIG. 7 depicts a high level block diagram of a tactile sensation generation system.

FIG. 7 depicts a high level block diagram of a tactile sensation generation system 100 containing a computer system or video game console 102, a tactile sensation generator 110 and a control system 106 for the tactile sensation generator 110. The control system 106 further contains an audio signal processor 112 and a control signal generator 114. The home computer 102 may, of course, be replaced with any device that produces an audio signal such as a video game console, stereo system, television receiver, microphone, and the like. However, for simplicity, throughout this disclosure, it is assumed that the audio source is a conventional home computer executing a video game program. As such, the control system 106 converts the audio signals conventionally generated by the video game into control signals for the tactile sensation generator.

More specifically, the computer 102 has its audio output port, e.g., an earphone jack, connected, via line 104, to audio signal processor 112 within the control system 106. In general, the signal processor analyzes the frequency, amplitude, and rate of change of the audio signal produced by the currently executing video game. From the analysis of the audio signal, the audio signal processor 112 produces a processed signal. The processed signal forms an input to the control signal generator 114 which produces a control signal, on line 108, for the tactile sensation generator 110.

The tactile sensation generator can be one or more devices (actuators) capable of simulating vibration, punches, bullet strikes and the like in accordance with specific control signals. Consequently, while using the inventive apparatus, a player experiences a virtual reality while interacting with the video game. To provide a full understanding of the invention, a detailed example of a tactile sensation generator is provided below.

Figure 8:
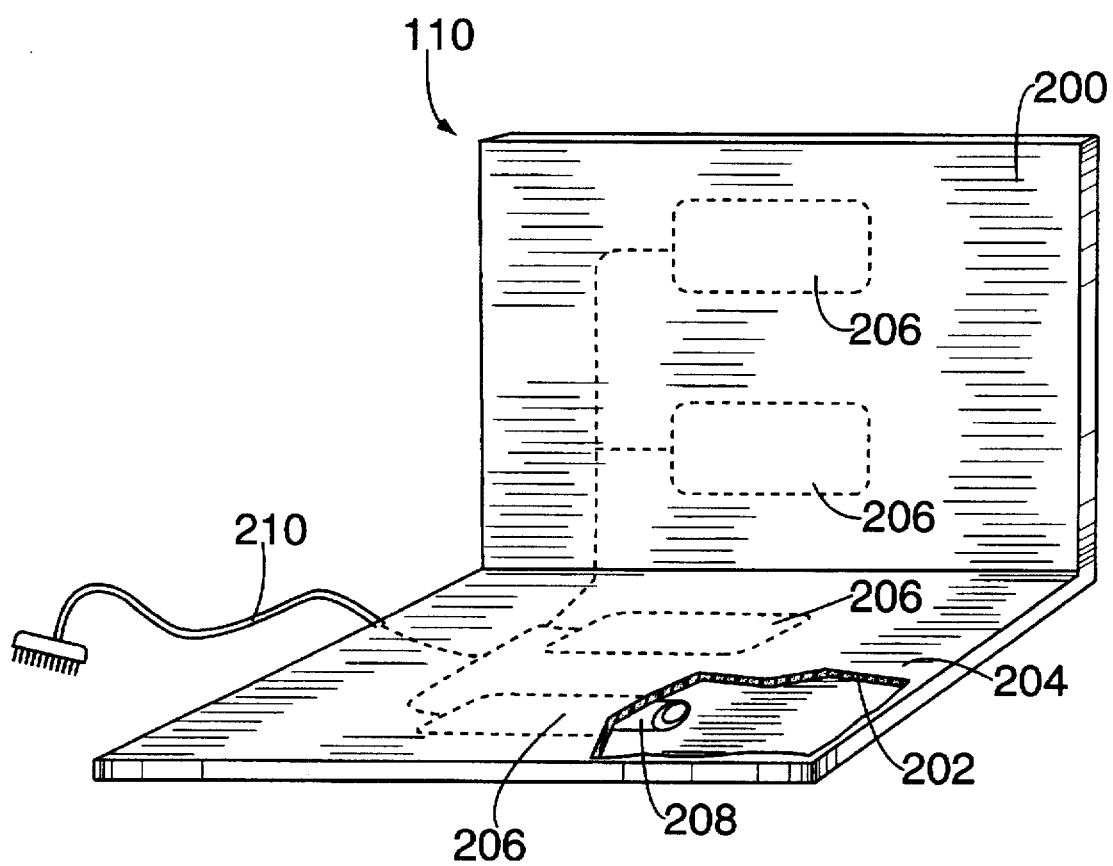
FIG. 8 schematically depicts an illustrative tactile sensation generator.

FIG. 8 depicts one example of a tactile sensation generator 110 capable of being controlled by the control system 106. Specifically, the tactile sensation generator contains a seat pad 200 having localized vibration producing actuators 206 distributed within the pad. The seat pad 200 is a foam cushion 202 enclosed in a cloth cover layer 204. Beneath the cover layer 204 are electric motors having offset weights mounted to their shafts. One such motor 208 is depicted in FIG. 8. When activated by control signals applied via wires 210, the shafts of the motors rotate and the offset weights cause the motors to vibrate. The depicted seat has four such vibrating motors. A seat pad of this type is available as model 905 from JB Research of Los Angeles, Calif. Although tactile sensation is generated in this example by vibrating electric motors, those skilled in the art will realize that any type of vibrating actuator may be used in lieu of motors including buzzers, solenoids, piezo-electric actuators, and the like. Also, any number of actuators can be used, i.e., one or more actuators. Furthermore, the tactile sensation actuators do not have to be vibratory. It is foreseeable that other forms of generators such as solenoids could be used to poke and prod a player with a single strike when a bullet or fist impact is to be simulated.

Using the seat pad described above, a video game such as an auto racing game produces simulated vibration as a player's video game car accelerates, e.g., increased vibration with engine revs (higher pitched sound). The amplitude and frequency of the vibration is changed as the video car changes speed. Also, impacts with obstacles that are evidenced by low frequency, high amplitude audio signals result in forceful, high-frequency vibrations throughout the seat pad. Consequently, while playing the video game, a player receives a tactile sensation of actually sitting in a race car. To enhance the virtual reality effect, vibrating wrist and/or ankle tactile sensation generators can be applied to the player in addition to the seat pad. In accordance with the teachings of the present invention, the control system 106 produces control signals for the vibration actuators 206.

Figure 9:
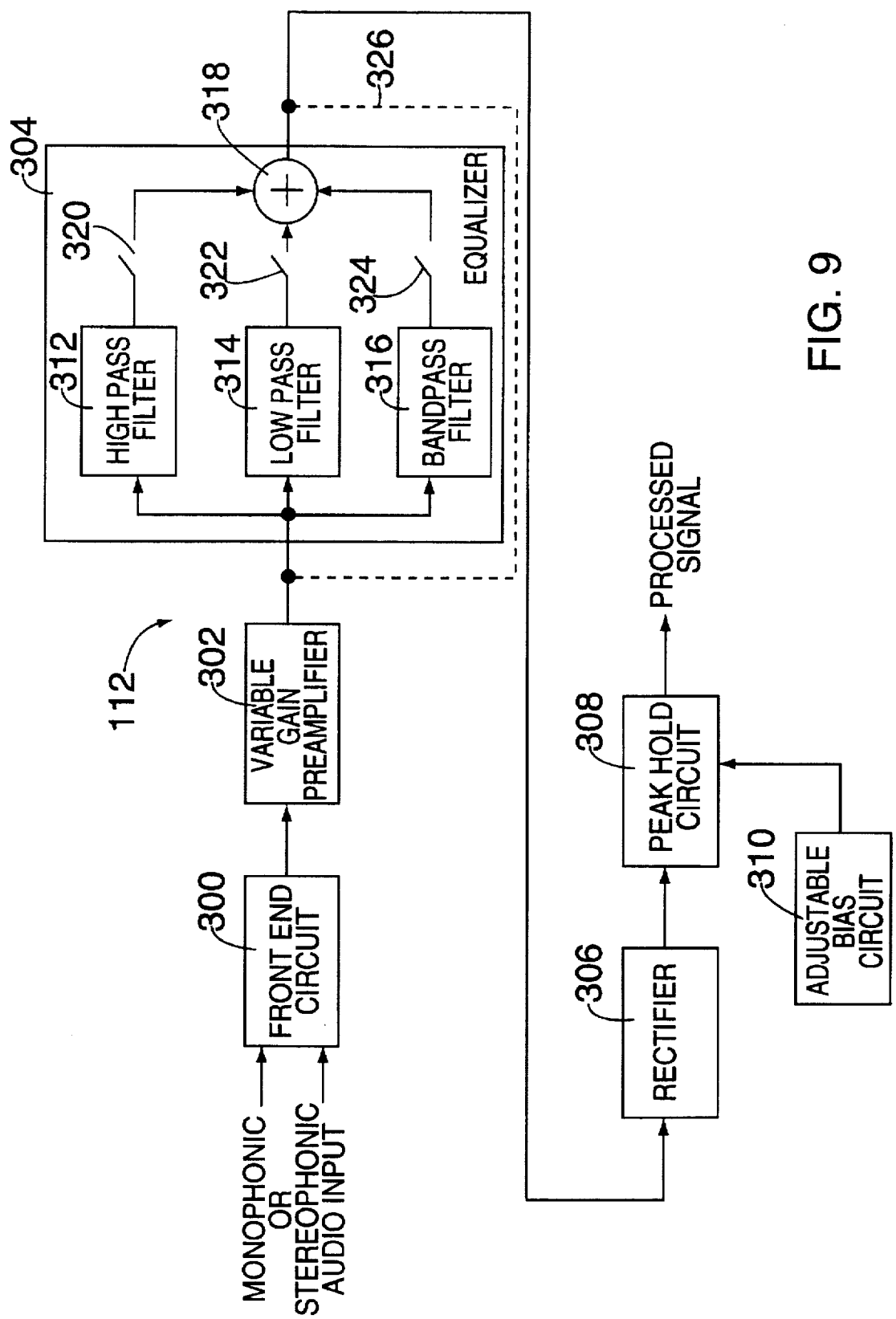
FIG. 9 depicts a detailed block diagram of the audio signal processor of FIG. 7.

FIG. 9 depicts a detailed block diagram of the audio signal processor 112. In general, the input to processor 112 is an audio signal from an audio source, any audio source. The signal may be either stereophonic or monophonic. The processor 112 responds to the pitch (frequency), volume (amplitude) and rate of change of the audio signal by producing a processed signal indicative of these characteristics of the input audio signal.

Specifically, the audio signal processor 112 contains a front end circuit 300, a preamplifier 302, an equalizer 304, a rectifier 306, a peak hold circuit 308, and an adjustable bias circuit 310. These major components are more or less connected in series.

More specifically, the front end circuit 300 contains a mixer for combining both channels of a stereophonic audio signal to form a composite audio signal, a high pass filter for limiting noise that is below of the audio band, e.g., lower than 20 Hz, and a diode signal limiter for limiting (clipping) the amplitude of the input signal to protect the audio signal processor from being damaged by overly powerful input audio signals. Circuitry 300 is connected to a variable gain preamplifier 302.

The variable gain preamplifier 302 establishes the dynamic range of the entire audio signal processor 112. For instance, if the gain of the preamplifier is set to high, any loud (high amplitude) signals would saturate the processor and, as such, not create the desired tactile sensation. On the other hand, if the preamplifier gain is set too low, low amplitude audio signals would not generate any tactile sensation and only high amplitude signals would cause a tactile response. Consequently, a player must adjust the gain of the preamplifier to conform to audio signal levels generated by the game currently being played. In other words, the specific gain setting depends upon the dynamic range of input audio signal and the player's tactile sensation preferences. Illustratively, the voltage gain of the preamplifier is variable from no gain to a 1000 times. In some applications where the audio signal has a low amplitude, additional fixed gain amplification may be necessary before and/or after the variable gain preamplifier.

Once amplified, the audio signal forms an input to the equalizer 306. The equalizer contains three parallel connected filters: a high pass filter 312, a low pass filter 314, and an bandpass filter 316. The high pass filter has an illustrative passband of 2 kHz to 13 kHz, the low pass filter has an illustrative passband of 28 Hz to 350 Hz, and the bandpass filter has a passband of 230 Hz to 10.3 kHz. The three paths each form an input to a summing amplifier 318. Additionally, each of the three paths has a switch (switches 320, 322, and 324) to select one or more of the paths as an input to the summing amplifier 318. As such, depending on which of the signal paths are connected to the summing amplifier, the equalizer can selectively amplify or attenuate low frequencies, high frequencies or both. As such, a game player can adjust the frequency content of the audio that is used to generate tactile sensation generator control signals and, consequently, tailor the tactile sensation to the game being executed.

Nonetheless, the equalizer 304 is an optional circuit for the invention. The equalizer permits optimizing the tactile sensation to a audio source, e.g., the equalizer enables a video game player to exclude the background music of the game from the audio signal that produces a tactile sensation. Therefore, if such additional flexibility is not desired, the equalizer can be deleted.

The rectifier 306 is provided to produce a positive signal from the bi-polar filtered audio signal. The peak hold circuit 308 responds quickly to the peak amplitude of the rectified signal, but slowly decays from that peak amplitude. Specifically, the peak hold circuit contains a parallel combination of a capacitor and a resistor. The capacitor charges as the rectified audio signal is applied thereacross. The resistor has a very large resistance, e.g., 10MΩ, such that the capacitor (0.022 µF) discharges slowly through the resistance. As a result, the capacitor temporarily holds the peak amplitude of the rectified audio. The voltage level on the capacitor forms an input to a high impedance voltage amplifier. This implementation of the peak circuit samples both the frequency and amplitude of the rectified audio signal, i.e., when either the frequency or amplitude of the input signal change, the output signal will change to some degree. As such, the output of the peak hold circuit contains information pertaining to the frequency and amplitude of the rectified signal.

The specific time constant of this RC circuit is defined by the response time of the actuators used in the tactile sensation generator. For example, the response of electric motors is rather slow; therefore, the resonant frequency of the RC circuit would be approximately 90 Hz. In contrast, if the actuators in the tactile sensation generator are piezo-electric actuators; then, the resonant frequency of the RC circuit would be on the order of a thousand hertz or more.

Also, a DC bias voltage, generated by adjustable bias circuit 310, is added to the peak held signal such that the amplifier output signal is a composite (sum) of the peak held signal and the DC bias value. The bias value is a player adjustable offset. The utility of this DC bias is discussed below. The biased and amplified peak held signal is hereinafter referred to as a processed signal.

Figure 10:
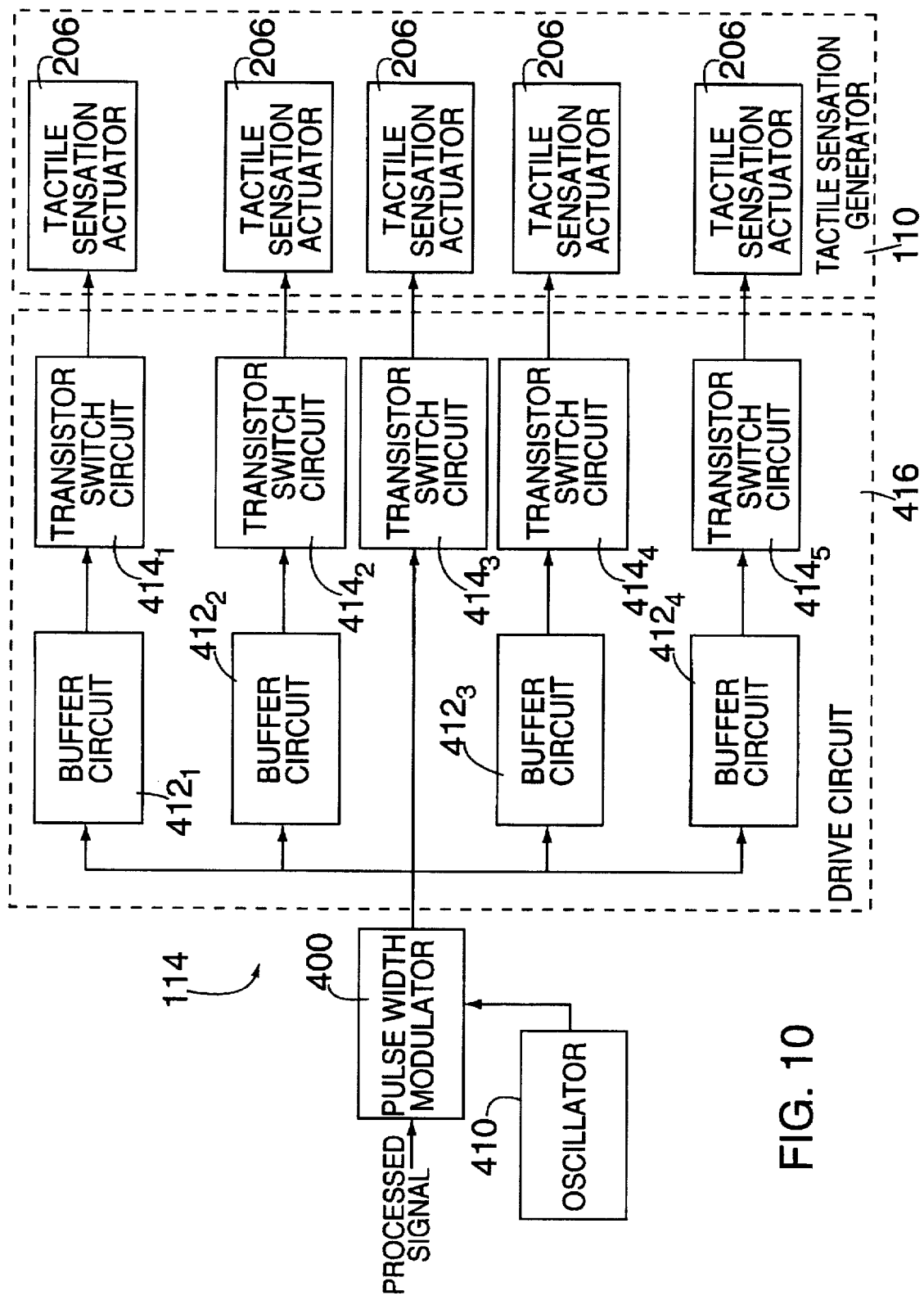
FIG. 10 depicts a detailed block diagram of the control signal generator of FIG. 7.

FIG. 10 depicts a detailed block diagram of the control signal generator 114. Specifically, the control signal generator contains a pulse width modulator 400, an oscillator 410, and drive circuit 416 for the tactile sensation generator 110. The processed signal forms an input to the pulse width modulator 400, e.g., a conventional 555 timer. Those skilled in the art will realize from this disclosure that other forms of modulation such as frequency modulation are also useful in lieu of pulse width modulation.

The pulse width modulator generates a pulse having a width that corresponds to the amplitude of the input signal to the pulse width modulator. As such, if a constant DC voltage level (e.g., the DC bias discussed above) forms an input to the pulse width modulator, the modulator will generate an output pulse having a pulse width indicative of the amplitude of that DC signal. When an AC signal forms the input to the modulator (e.g., the processed signal), each output pulse from the modulator has a duration that is indicative of the instantaneous amplitude of the AC signal sampled at the clock rate. As such, for each clock pulse, the pulse width modulator generates an output pulse having a width defined by the amplitude of the processed signal at the moment the clock pulse occurs. The pulse width of the output pulse defines the activation duration for an actuator 206 in the tactile sensation generator 110, e.g., the longer the pulse width the longer the vibration time.

The oscillator 410 generates a clock signal for the pulse width modulator 400. Typically, the clock signal has a fixed, nominal pulse rate that is slightly longer than the maximum possible duration of an output pulse of the pulse width modulator. The clock rate is optionally adjustable from the minimum clock pulse spacing (e.g., slightly longer than the maximum possible duration of the modulator output pulse). By increasing the spacing between the clock pulses and having a fixed maximum duration for the output pulse of the modulator, the effective duty cycle of the pulse width modulator output pulse is reduced. For example, if the clock pulse spacing is doubled from its minimum rate and the modulator is currently producing maximum width pulses, the duty cycle is effectively halved by the clock pulse spacing increase, i.e., the output pulse of the modulator is generated for half the time between the clock pulses. In this manner, a player may adjust the intensity of the vibration to a comfortable level.

The output signal from the pulse width modulator 400 is used by the drive circuit 416 to turn on and off one or more actuators 206 in the tactile sensation generator 110. The drive circuit contains at least one transistor switch circuit $414_3$. The transistor switch circuit $414_3$, in response to the output pulse of the modulator 400 becomes activated, e.g., conducts current, such that the transistor circuit, once activated, allows current to pass through an actuator 206 to ground. In response, the actuator 206, e.g., a DC motor, vibrates. A pulse width modulator, such as the 555 timer, is generally capable of driving a single transistor to activate a single actuator. To enable the pulse width modulator to drive multiple transistor circuits $414_1$ through $414_5$ and multiple actuators 206, one or more buffer circuits $412_1$ through $412_4$ are typically provided between the transistor circuits and the pulse width modulator.

The drive circuit 416 causes the tactile sensation actuators 206 to generate a tactile sensation for the player in response to audio signals presently being generated by the video game. By adjusting the filtering of the equalizer, the preamplifier gain, and the oscillator clock rate, the player can tailor the responsiveness of the control system to any particular game or other audio source. In addition, by adjusting the DC bias, the player can generate constant background (i.e., low amplitude) tactile sensation such as constant vibration of a race car while idling. As such, the present invention provides superb virtual reality excitement for a video game player.

The foregoing disclosure focused upon the use of the invention to provide a virtual reality experience to a video game player. However, this is not the only application for the invention. For example, it is foreseeable that the invention could be used to provide therapeutic tactile sensations to injured persons, e.g., vibrating certain muscles during physical therapy. Also, the invention can be used as a device for the hearing impaired, e.g., as a warning device that provides a tactile sensation when a certain sound occurs nearby such as a car horn, warning sound, and the like. Furthermore, the invention could be used in conjunction with a voice analyzer to provide a hearing impaired person with a tactile sensation in response to certain spoken words.

Although various embodiments which incorporate the teachings of the present invention have been shown and described in detail herein, those skilled in the art can readily devise many other varied embodiments that still incorporate these teachings.

What is claimed is:

1. In a virtual reality computer system, apparatus for providing, in response to signals generated by said virtual reality computer system, a tactile sensation to a user of said virtual reality computer system, said apparatus comprising:
   a flexible pad;
   a plurality of actuators, attached to said pad, for selectively generating said tactile sensation; and
   a control circuit, coupled to said plurality of actuators, where said control circuit is responsive to an audio signal for generating a control signal to control activation of said plurality of actuators, where said audio signal corresponds to action portrayed on said virtual reality computer system.

2. The apparatus of claim 1, wherein said flexible pad further comprises:
   a first portion being substantially rectangular;
   a second portion, attached along an edge to said first portion, being substantially rectangular; and
   where said first portion interfits with a back portion of a chair and said second portion interfits with a seat portion of a chair.

3. The apparatus of claim 1 wherein said flexible pad is affixed to a stationery seating system.

4. The apparatus of claim 1 wherein said flexible pad is substantially shaped as a motorcycle seat.

5. The apparatus of claim 1 wherein each actuator in said plurality of actuators are imbedded within said flexible pad.

6. The apparatus of claim 1 wherein each actuator in said plurality of actuators is an electric motor having a shaft with an offset weight attached thereto.

7. The apparatus of claim 6 wherein each of said electric motors are enclosed in a housing.

8. The apparatus of claim 7 wherein each of said electric motors is embedded in said flexible pad and a covering material is affixed to a surface of the flexible pad where each of said electric motors are sealed within said flexible pad by said covering material.

9. The apparatus of claim 1 wherein each actuator in said plurality of actuators is independently activated.

10. The apparatus of claim 1 wherein said plurality of actuators are organized into groups and each of said groups are independently activated.

11. The apparatus of claim 1 wherein each of said actuators is a solenoid.

12. The apparatus of claim 2 wherein said first portion contains a first set of actuators and said second portion contains a second set of actuators.

13. The apparatus of claim 12 wherein said first set of actuators is linearly arranged to generate a tactile sensation in the back of said user.

14. The apparatus of claim 12 wherein said second set of said actuators is arranged to generate a tactile sensation in the buttocks and legs of said user.

15. The apparatus of claim 1 wherein said control circuit comprises:
   an audio signal processor for processing said audio signal and generating a processed signal; and
   a control signal generator, coupled to said audio signal processor, for generating, in response to said processed signal, said control signal.

16. The apparatus of claim 15 wherein said audio signal processor generates said processed signal in response to a frequency, amplitude and rate of change of said audio signal, where said audio signal corresponds to a scene displayed on the virtual reality computer system.

17. The apparatus of claim 16 wherein said audio signal processor further comprises an equalizer for selectively amplifying or attenuating selected frequency bands of said audio signal.

18. The apparatus of claim 17 wherein said audio signal processor further comprises a rectifier for rectifying said audio signal.

19. The apparatus of claim 15 wherein said control signal generator further comprises an oscillator for generating timing signals for said control signal generator.

20. The apparatus of claim 1 wherein said control circuit comprises:
   a front end circuit for forming a composite audio signal from a stereophonic audio signal;
   a variable gain preamplifier, coupled to said front end circuit, for amplifying said composite audio signal;
   an equalizer, coupled to said variable gain preamplifier, for selectively filtering said amplified composite audio signal;
   a rectifier, coupled to said equalizer, for rectifying said equalized signal;
   a peak hold circuit, coupled to said rectifier, for temporarily holding said rectified signal and for adding a DC bias to said rectified signal to generate a processed signal; and
   a control signal generator, coupled to said peak hold circuit, for generating, in response to said processed signal, said control signal.

21. In a virtual reality computer system, apparatus for providing, in response to signals generated by said virtual reality computer system, a tactile sensation to a user of said virtual reality computer system, said apparatus comprising:
   a stationary seating system;
   a flexible seat cushion affixed to said stationary seating system;
   a plurality of actuators, attached to said flexible seat cushion, for selectively generating said tactile sensation; and a control circuit, coupled to said plurality of actuators, where said control circuit is responsive to an audio signal for generating a control signal to control activation of said plurality of actuators, where said audio signal corresponds to action portrayed on said virtual reality computer system.

22. The apparatus of claim 21, wherein said flexible seat cushion further comprises:

a first portion forming a back portion for said seating system; and a second portion, attached along an edge to said first portion, forming a seat portion of said seating system.

23. The apparatus of claim 21 wherein said flexible seat cushion is substantially shaped as a motorcycle seat.

24. The apparatus of claim 21 wherein each actuator in said plurality of actuators are imbedded within said flexible seat cushion.

25. The apparatus of claim 21 wherein each actuator in said plurality of actuators is an electric motor having a shaft with an offset weight attached thereto.

26. The apparatus of claim 25 wherein each of said electric motors are enclosed in a housing.

27. The apparatus of claim 26 wherein each of said electric motors is embedded in said flexible seat cushion and a covering material is affixed to a surface of the flexible seat cushion where each of said electric motors are sealed within said flexible seat cushion by said covering material.

28. The apparatus of claim 21 wherein each actuator in said plurality of actuators is independently activated.

29. The apparatus of claim 21 wherein said plurality of actuators are organized into groups and each of said groups are independently activated.

30. The apparatus of claim 21 wherein each of said actuators is a solenoid.

31. The apparatus of claim 22 wherein said first portion contains a first set of actuators and said second portion contains a second set of actuators.

32. The apparatus of claim 31 wherein said first set of actuators is linearly arranged to generate a tactile sensation in the back of said user.

33. The apparatus of claim 31 wherein said second set of said actuators is arranged to generate a tactile sensation in the buttocks and legs of said user.

34. The apparatus of claim 22 further comprising a chest portion containing at least one actuator, said chest portion being supported by a harness that positions the chest portion against the chest of said user.

35. The apparatus of claim 34 wherein said harness is pivotable to a first position where the chest portion is maintained against the chest of said user and a second position where the chest portion is separated from the chest of said user.

* * * * *